(12) United States Patent
Tchidjo Moyo et al.

(10) Patent No.: US 8,769,540 B2
(45) Date of Patent: Jul. 1, 2014

(54) METHOD FOR THE REAL-TIME ORDERING OF A SET OF NONCYCLICAL MULTI-FRAME TASKS

(75) Inventors: Noël Tchidjo Moyo, Colombes (FR); Vincent Seignole, Paris (FR); Frédéric Lafaye, Argenteuil (FR)

(73) Assignee: Thales, Neuilly sur Seine (FR)

( * ) Notice: Subject to any disclaimer, the term of this patent is extended or adjusted under 35 U.S.C. 154(b) by 278 days.

(21) Appl. No.: 13/395,102

(22) PCT Filed: Sep. 7, 2010

(86) PCT No.: PCT/EP2010/063109
§ 371 (c)(1),
(2), (4) Date: Jul. 20, 2012

(87) PCT Pub. No.: WO2011/029816
PCT Pub. Date: Mar. 17, 2011

(65) Prior Publication Data
US 2012/0284728 A1    Nov. 8, 2012

(30) Foreign Application Priority Data
Sep. 8, 2009 (FR) ................................. 09 04269

(51) Int. Cl.
*G06F 9/46*    (2006.01)
*G06F 9/48*    (2006.01)

(52) U.S. Cl.
CPC .................................. *G06F 9/4887* (2013.01)
USPC ......................................... 718/103; 718/102

(58) Field of Classification Search
None
See application file for complete search history.

(56) References Cited

U.S. PATENT DOCUMENTS

2003/0061260 A1* 3/2003 Rajkumar ..................... 709/104

OTHER PUBLICATIONS

Kevin Jeffay, et al., "A Theory of Rate-Based Execution", The 20th IEEE Real-Time Systems Symposium, Dec. 1, 1999, pp. 304-314, IEEE Comput. Soc. (DOI:10.1109/REAL.1999.818858), Los Alamitos, CA, US, XP010366890.
Tarek F. Abdelzaher, et al., "A Utilization Bound for Aperiodic Tasks and Priority Driven Scheduling", IEEE Transactions on Computers, Mar. 1, 2004, pp. 334-350, IEEE Service Center (DOI:10.1109/TC.2004.1261839), Los Alamitos, CA, US, XP011106105.
Shelby Funk, "Generalized Feasibility Analysis on Uniform Multiprocessors", Work in Progress Proceedings of the 14 Euromicro Conference on Real-time Systems, Jun. 2007, pp. 1-4 Online URL:http://webster.cs.uga.edu/{shelby/pubs/UnifFeasibility.pdf, Pisa Italy, XP 002579034.
Karsten Albers, et al., "An Event Stream Driven Approximation for the Analysis of Real-Time Systems", Proceedings of the Euromicro Conference on Real-Time Systems, Jun. 30, 2004, pp. 187-195, XP002383592.
Sanjoy Baruah, et al., "The Feasibility Analysis of Multiprocessor Real-Time Systems", 18th Euromicro Conference on Dresden—Real-Time Systems, Jul. 5-7, 2006, pp. 87-96, IEEE, Piscataway, NJ, USA, XP010927453.
Hiroaki Takada, et al., "Schedulability of Generalized Multiframe Task Sets under Static Priority Assignment", Fourth International Workshop on Real-time Computing Systems and Applications, Taipei, Taiwan, Oct. 27-29, 1997, pp. 80-86, IEEE Comput. Soc. (DOI:10.1109/RTCSA.1997.629177), XP010251850.
F. Singhoff, et al., "Cheddar : a Flexible Real Time Scheduling Framework", ADA Letters ACM USA, Dec. 2004, pp. 1-8, vol. 24, No. 4, XP002579035.
Aloysius K. Mok, et al, "A Multiframe Model for Real-Time Tasks", IEEE Transactions on Software Engineering, Oct. 1997, pp. 635-645, vol. 23, No. 10.
Sanjoy Baruah, et al, "Generalized Multiframe Tasks", pp. 1-17.

* cited by examiner

*Primary Examiner* — Kenneth Tang
(74) *Attorney, Agent, or Firm* — Baker Hostetler LLP

(57) ABSTRACT

A method for real-time scheduling of an application having a plurality m of software tasks executing at least one processing operation on a plurality N of successive data frames, each of said tasks i being defined at least, for each of said frames j, by an execution time $C_i^j$, an execution deadline $D_i^j$ and a guard time $P_i^j$ with respect to the next frame j+1, said guard time $P_i^j$ being greater than or equal to said deadline $D_i^j$, includes: for each task i, calculating the ratios $$\frac{C_i^j}{D_i^j}$$

and then searching for the maximum over all frames j of ratios $$\max\left(\frac{C_i^j}{D_i^j}\right),$$

comparing the sum $$\sum_{i=0}^{m-1} \max_{0 \leq j \leq N-1}\left(\frac{C_i^j}{D_i^j}\right)$$

with the number of processors operating in parallel over which the total computation load of the real-time application is distributed, and, if said sum $$\sum_{i=0}^{m-1} \max_{0 \leq j \leq N-1}\left(\frac{C_i^j}{D_i^j}\right)$$

is less than or equal to the number of processors, concluding on the feasibility of the real-time execution of all said software tasks distributed over said processors.

8 Claims, 5 Drawing Sheets

METHOD FOR THE REAL-TIME ORDERING OF A SET OF NONCYCLICAL MULTI-FRAME TASKS

CROSS-REFERENCE TO RELATED APPLICATIONS

This application is a National Stage of International patent application PCT/EP2010/063109, filed on Sep. 7, 2010, which claims priority to foreign French patent application No. FR 0904269, filed on Sep. 8, 2009, the disclosures of which are incorporated by reference in their entirety.

FIELD OF THE INVENTION

The subject of the present invention is a method for the real-time scheduling of multi-frame software tasks. It relates to the field of real-time processors, for example signal processing processors, on which a plurality of functions, also called software tasks, are run, which may be concurrent, that is to say be invoked simultaneously. The invention relates more particularly to the issue of the real-time scheduling of the software tasks executed by one or more software applications on one or more parallel processors.

A multi-frame task is a task or software function which executes a processing operation on a plurality of data frames with which are associated an execution time, a deadline and a guard time with respect to the next frame. The execution time C is the time needed to execute, on said data frame, the functional processing operation defined by the corresponding task on a given processor. It depends both on the complexity of the processing operation to be executed and on the resources of the processor, notably its operating frequency. The deadline D corresponds to the relative time which elapses between the activation of a task and the time at the end of which the execution of this task must be finalized. The deadline depends notably on time constraints linked to the software application or to the system implemented which uses this application. The guard time P corresponds to the minimum time which elapses between two successive calls to a same task.

BACKGROUND

One of the problems that the invention seeks to resolve is to guarantee the real-time feasibility of the implementation of a set of multi-frame tasks, which together define an application or a system, having given execution time, deadline and guard time parameters on a given processor. To this end, the technical problem to be resolved relates to the real-time scheduling of these tasks on this processor. In order to guarantee that the design of the software tasks is valid for a real-time implementation, it is necessary to test whether the time limits are never exceeded by checking notably that each task is executed well before its deadline. The resolution of this technical problem makes it possible to validate the correct operation of the scheduler which is implemented by the operating system associated with the processor.

A scheduler is a component of the operating system whose function is to determine the order in which the tasks or processes will be executed on a processor so as to observe the real-time constraint. The use of a scheduler makes it possible to execute a number of tasks or processes in parallel on a single processor by sharing its resources in time. In this way, the real-time execution of the tasks is possible. However, there are cases in which the specification of the software tasks to be executed is such that it does not allow for their simultaneous real-time execution, and in this case the scheduler cannot operate correctly because it will be required to resolve a problem which has no solution. These solutions are not necessarily easy to detect and avoid, notably in the case of complex applications which use a number of concurrent tasks which are themselves executing a processing operation on a number of data frames having execution constraints that are bounded in time. It is therefore important to be able to detect these cases during the design phase of the overall architecture of the system in order to redefine the parameters of the software tasks that are to be deployed on a given processor if said tasks are not compatible with a real-time execution.

One scheduling policy known to those skilled in the art is the dynamic priority scheduling method, known by the abbreviation EDF (Earliest Deadline First). This method consists in assigning a dynamic priority to each task or process according to the deadline thereof. The nearer the deadline of a task, the higher its priority. The invention is positioned notably in the context of this scheduling method.

The document [1] describes the concept of multi-frame tasks and proposes modeling a set of real-time software tasks using this concept. A multi-frame task is a task or software function which executes a processing operation on a plurality of data frames characterized by the three parameters of execution time E, deadline D and guard time P introduced previously in this document, and for which, in addition, the execution time E is variable from one frame to another.

The document [2] reprises this concept, generalizing it to a set of multi-frame tasks for which the deadline D and the guard time P are also variable. A feasibility test associated with a dynamic priority scheduling method (such as the EDF method) is proposed in the document [2]. This method is based on the construction of a bounded requirement function dependent on the parameters E, D and P and that makes it possible to validate the feasibility of the real-time execution of a plurality of software tasks on a given processor.

The solution proposed by the document [2] is limited to the particular case in which there is a periodicity, also called cycle, in the successive call to the tasks and the time sequencing of the processing of the frames. In this case, it is possible to find a repetition pattern which entirely defines the time sequencing of the execution of a task over a given period of time. An example of such a case is described in FIG. 1. A software task i which executes a processing operation on three different types of data frames, each characterized by the three parameters that are execution time $C_i^1$, $C_i^2$, $C_i^3$, deadline $D_i^1$, $D_i^2$, $D_i^3$ between the instant when the task is activated and the instant when it needs to have terminated the processing of the frame to observe the real-time constraints and guard time $P_i^1$, $P_i^2$, $P_i^3$ between two successive calls to this task. At the end of a cycle time $T=P_i^1+P_i^2+P_i^2$, the time execution pattern of the task i is repeated periodically as illustrated in FIG. 1. The task i is then qualified as a cyclic multi-frame task.

Such a case corresponds, for example, to the case of a video compression device of MPEG (Motion Picture Expert Group) type which can manipulate three types of different data frames known to those skilled in the art by the frame identifier I, P or B, and which are transmitted more often than not according to a cyclic time pattern.

The requirement function introduced in [2] and that makes it possible to test the feasibility of a set of multi-frame tasks, uses the period or cycle T to resolve the problem of scheduling of the tasks and is therefore limited to the case of cyclic tasks.

SUMMARY OF THE INVENTION

The invention proposes a solution that makes it possible to resolve the problem of feasibility of a set of multiframe software tasks when none of these exhibits a repetition pattern in time. In particular, this case corresponds to a random processing of the data frames where their instant of arrival is not known in advance. An example of such a scenario is schematically represented in FIG. 2. The same software task i as that illustrated in FIG. 1 is represented but this time in a case of an application for which the three data frames are not processed according to a cyclic time scheme because they arrive in a random order. This case corresponds, for example, to an OFDMA (Orthogonal Frequency Division Multiple Access) modulation device which generates data frames allocated to different users and therefore having different characteristics and which are transmitted in a non-predictable order.

To this end, the subject of the invention is a method for the real-time dynamic priority scheduling of an application executed on at least one processor, said application consisting of a plurality m of software tasks executing at least one processing operation on a plurality of N successive data frames, each of said tasks i being defined at least, for each of said frames j, by an execution time $C_i^j$, an execution deadline $D_i^j$ and a guard time $P_i^j$ with respect to the next frame j+1, said guard time $P_i^j$ being greater than or equal to said deadline $D_i^j$, said method being characterized in that it comprises at least the following steps:

for each task i, calculating the ratios $$\frac{C_i^j}{D_i^j}$$

between the execution time $C_i^j$ of each frame j and the corresponding deadline $D_i^j$, for each task i, searching for the maximum of said ratios over all of said frames j $$\max\left(\frac{C_i^j}{D_i^j}\right),$$

comparing the sum $$\sum_{i=0}^{m-1} \max_{0 \le j \le N-1}\left(\frac{C_i^j}{D_i^j}\right)$$

over all of said tasks i of said maxima with the number p of processors operating in parallel over which the total computation load of said real-time application is distributed, if said sum $$\sum_{i=0}^{m-1} \max_{0 \le j \le N-1}\left(\frac{C_i^j}{D_i^j}\right)$$

is less than or equal to the number p of processors, then concluding on the feasibility of the real-time execution of all of said software tasks distributed over said processors and associating a dynamic execution priority with the task i according to its execution deadline $D_i^j$ so that, at a given instant, the task which has the highest priority is the one whose deadline is the closest in time $D_i^j$, if said sum $$\sum_{i=0}^{m-1} \max_{0 \le j \le N-1}\left(\frac{C_i^j}{D_i^j}\right)$$

is strictly greater than the number p of processors, rejecting the task i and/or redefining its execution time $C_i^j$ and execution deadline $D_i^j$ parameters so as to satisfy the inequality $$\sum_{i=0}^{m-1} \max_{0 \le j \le N-1}\left(\frac{C_i^j}{D_i^j}\right) \le p.$$

In one embodiment of the invention, said data frames are sequenced in a random order and do not observe a cyclic pattern in time.

In one embodiment of the invention, said tasks execute, on said data frames, signal processing functions and said processors are digital signal processors (DSP).

In one embodiment of the invention, a single processor with variable frequency is used and said method also comprises the following steps:

if the following inequality $$\sum_{i=0}^{m-1} \max_{0 \le j \le N-1}\left(\frac{C_i^j}{D_i^j}\right) \le 1$$

is not satisfied, then multiplying, by a factor δ at least equal to $$\sum_{i=0}^{m-1} \max_{0 \le j \le N-1}\left(\frac{C_i^j}{D_i^j}\right),$$

the frequency of said processor, if said frequency multiplied by said factor δ is less than or equal to the maximum operating frequency of said processor, then associating a dynamic execution priority with the task i according to its execution deadline $D_i^j$ so that, at a given instant, the task which has the highest priority is the one whose deadline $D_i^j$ is the closest in time, if said frequency multiplied by said factor δ is greater than the maximum operating frequency of said processor, then rejecting the task i and/or redefining its execution time $C_i^j$ and execution deadline $D_i^j$ parameters so as to satisfy the inequality $$\sum_{i=0}^{m-1} \max_{0 \le j \le N-1}\left(\frac{C_i^j}{D_i^j}\right) \le 1.$$

Also the subject of the invention is a scheduling device for a real-time application executed on at least one processor with a fixed or variable operating frequency, said application consisting of a plurality m of software tasks executing at least one function on a plurality N of successive data frames, said device being characterized in that it comprises means for implementing the scheduling method described previously.

BRIEF DESCRIPTION OF THE DRAWINGS

Other features will become apparent from reading the following detailed description, given as a nonlimiting example in light of the appended drawings which represent.

DETAILED DESCRIPTION

Figure 1:
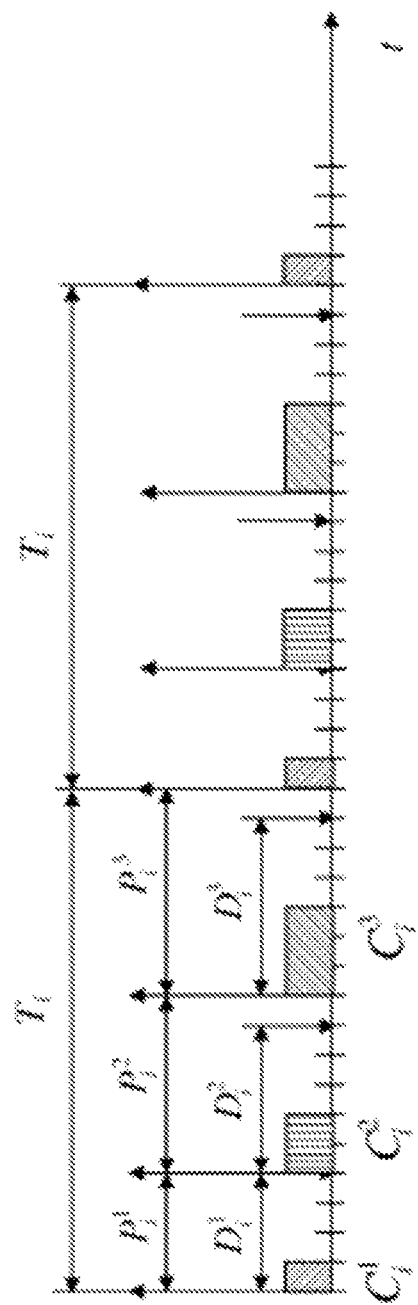
FIG. 1, a diagram of an example of cyclic multi-frame tasks and their execution over time, FIG. 2, a diagram of an example of non-cyclic multi-frame tasks and their execution over time, FIG. 3, a block diagram of the method according to the invention, FIG. 4, an example of architecture of a real-time system for which the invention applies, FIG. 5, an example of a scheduling device according to the invention used to guarantee the real-time dependability of an application being executed on a platform comprising a number of identical processors.
Figure 2:
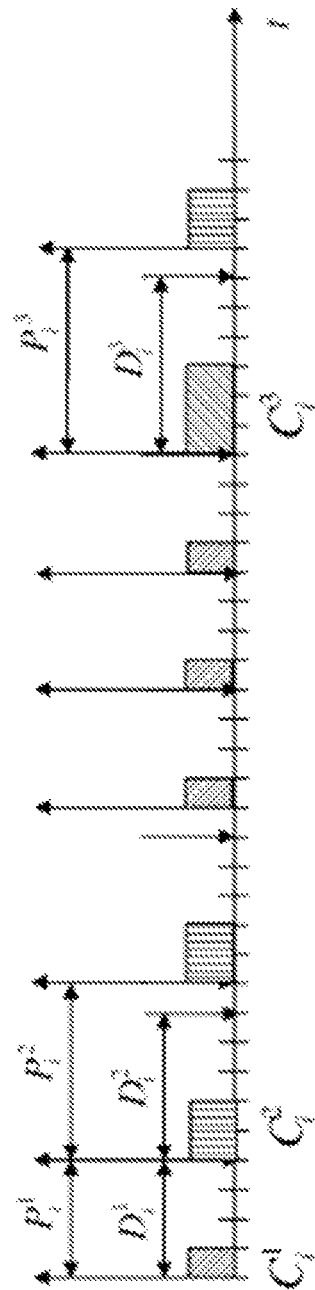
Figure 3:
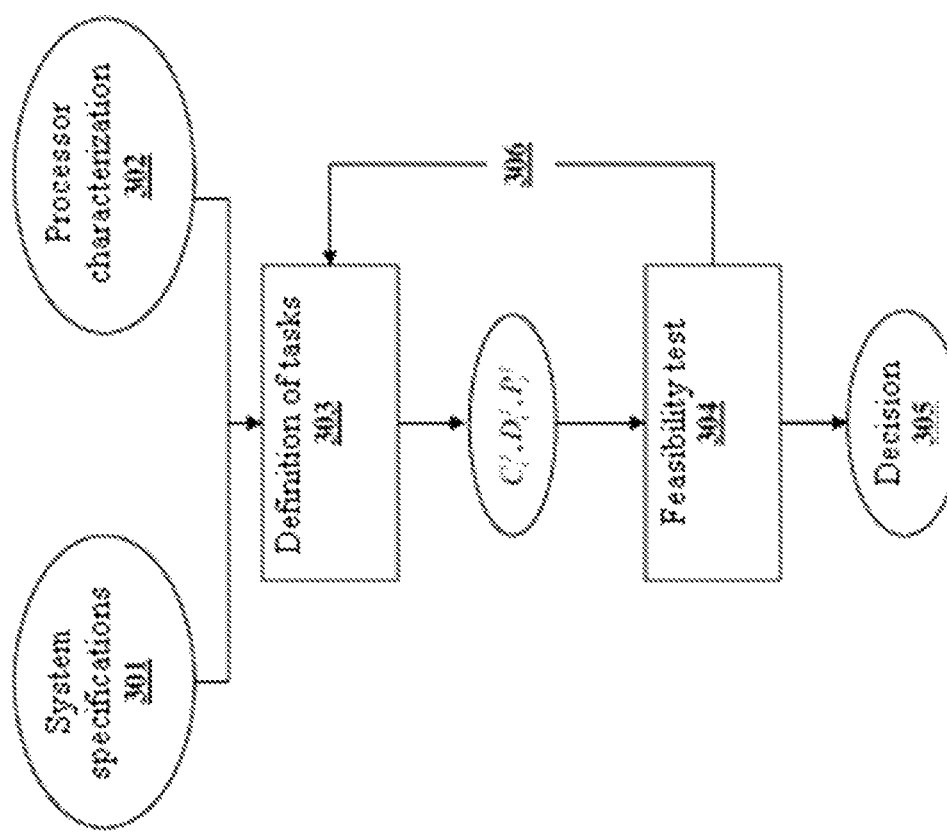

FIG. 3 schematically represents a diagram representing the steps of the method for scheduling software tasks according to the invention. The method falls into the context of a real-time system notably executing the software tasks that are to be scheduled on a given processor. The specified real-time system 301 makes it possible to define a set of software tasks which correspond to functions each executing a subset of the processing operations necessary to the operation of said system. The breakdown of the system into tasks is generally done during a design phase and depends notably on the specifications of the system, in particular the type of processing operations to be performed and their time constraints. The tasks that make up the system have to be executed on a processor, for example a signal processing processor of the DSP (Digital Signal Processing) type which also comprises intrinsic characteristics 302, for example its operating frequency or execution speed, which also impact on the design of the tasks. A task definition step 303 is therefore used to generate a set of tasks i for which three parameters are defined for each data frame j manipulated by the multiframe task i. These parameters are the execution time $C_i^j$ of the task i for the data frame j, its deadline $D_i^j$ and its guard time $P_i^j$.

A feasibility test 304 according to the invention is then applied in order to determine whether the set of the tasks designed in the step 303 can be scheduled on the chosen processor according to the EDF scheduling policy.

For a number m of tasks, each generating a number N of data frames, the feasibility test consists in checking the following relationship:

$$\sum_{i=0}^{m-1} \max_{0 \leq j \leq N-1} \left( \frac{C_i^j}{D_i^j} \right) \leq 1 \qquad (1)$$

If the relationship (1) is satisfied, the set of tasks considered can indeed be scheduled which means that all the tasks can be executed before their deadline by observing the real-time constraint.

Otherwise, a redefinition 306 of the tasks is necessary.

Dynamically, the method according to the invention is also applied when a new task is created and its feasibility has to be validated jointly with the set of tasks already designed. The application of the test according to the relationship (1) by incorporating this new task makes it possible to validate its incorporation or, otherwise, reject it and redefine its characteristics so that the parameters ($C_i^j$, $D_i^j$, $P_i^j$) observe the relationship (1).

The execution time $C_i^j$ can be determined either by estimating a priori the complexity of the processing operations executed by the task i on the frame j or by measuring, individually, the time needed to execute this task alone on the chosen processor. One way to adapt the execution time in order to enable the task i to observe the relationship (1) and therefore to be able to be scheduled, is to optimize the implementation of the algorithmic processing operations in order to speed up their execution speed.

The relationship (1) is a sufficient condition for the set of tasks which satisfy this relationship to be able to be scheduled according to an EDF scheduling policy, that is to say that the highest priority is granted to the task which has the closest deadline. The following paragraph aims to demonstrate that the checking of the relationship (1) is sufficient to ensure the feasibility of a real-time implementation of the non-cyclic multi-frame tasks and is therefore sufficient to resolve the technical problem mentioned at the start of this document.

To ensure that the real-time execution of a plurality of concurrent tasks which can be executed at non-predictable instants is observed, it is sufficient to replicate the worst case for which all the tasks are activated at the same time at an instant $t_0$. This case represents the most constraining situation since the processor is demanded by all the tasks at the same time. By considering only the first call to each task corresponding to the first frame to be processed, it is then verified that, if the real-time constraint is observed for this first activation, then it will also be observed for all the subsequent tasks which will not take place simultaneously and therefore represent a less constraining situation.

For the first call of each task, the configuration first considered is the one for which each task processes a frame $x_i$ corresponding to the greatest criticality or execution urgency which is reflected in a maximization of the ratio between the time needed to execute the processing operation associated with this frame and the execution deadline:

$$\frac{C_i^{x_i}}{D_i^{x_i}} = \max_{0 \leq j \leq N-1} \left( \frac{C_i^j}{D_i^j} \right) \qquad (2)$$

The relationship (1) therefore becomes:

$$\sum_{i=0}^{m-1} \frac{C_i^{x_i}}{D_i^{x_i}} \leq 1 \qquad (1')$$

If it is assumed that $D_{i-1}^{x_{i-1}} \leq D_i^{x_i}$, for any value of i, which is tantamount to sorting the tasks in ascending deadline order which is always possible, then, for the set of the tasks to be able to be scheduled according to an EDF-type scheduling policy, it is sufficient for each task i to observe the following relationship:

$$\sum_{k=0}^{i} C_k^{x_k} \leq D_i^{x_i} \quad (3)$$

In effect, on each deadline $D_i^{x_i}$, all the preceding tasks have to have been executed for the real-time constraint to be correctly observed. The preceding tasks are understood to be the tasks whose deadline precedes the deadline $D_i^{x_i}$.

We therefore seek to show that the relationship (1') implies the relationship (3) to prove the feasibility test according to the invention.

The relationship (1') is equivalent, by multiplying each member of the inequality by $D_i^{x_i}$, to:

$$C_i^{x_i} + \sum_{k=0; k \neq i}^{m-1} D_i^{x_i} \frac{C_k^{x_k}}{D_k^{x_k}} \leq D_i^{x_i} \quad (4)$$

Now, since all the terms of the sum are positive numbers, it can be deduced therefrom that:

$$C_i^{x_i} + \sum_{k=0}^{i-1} D_i^{x_i} \frac{C_k^{x_k}}{D_k^{x_k}} \leq C_i^{x_i} + \sum_{k=0; k \neq i}^{m-1} D_i^{x_i} \frac{C_k^{x_k}}{D_k^{x_k}} \quad (5)$$

And therefore $$C_i^{x_i} + \sum_{k=0}^{i-1} D_i^{x_i} \frac{C_k^{x_k}}{D_k^{x_k}} \leq D_i^{x_i} \quad (6)$$

Now, since $D_{i-1}^{x_{i-1}} \leq D_i^{x_i}$, then for any $k<i$, $D_k^{x_k} \leq D_i^{x_i}$ or even $$1 \leq \frac{D_i^{x_i}}{D_k^{x_k}}.$$

From the relationship (6) it is therefore possible to deduce that the relationship (3) is indeed observed, in other words:

$$\sum_{k=0}^{i} C_k^{x_k} \leq D_i^{x_i}$$

The preceding demonstration proves the feasibility test according to the invention in the case where the tasks concerned process only frames of type $x_i$ which exhibit a maximum criticality.

In a second step, the configuration is considered for which, on the first call, each task processes any frame $y_i$ less critical than the frame $x_i$, and which therefore satisfies the relationship:

$$\frac{C_i^{y_i}}{D_i^{y_i}} \leq \frac{C_i^{x_i}}{D_i^{x_i}} \quad (7)$$

From the relationships (1) and (7), it is found that:

$$\sum_{i=0}^{m-1} \frac{C_i^{y_i}}{D_i^{y_i}} \leq 1 \quad (8)$$

and the same reasoning as previously can be applied to demonstrate that the relationship (8) implies the following relationship:

$$\sum_{k=0}^{i} C_k^{y_k} \leq D_i^{y_i}$$

The preceding demonstration therefore proves, through successive steps, that the test implemented by the relationship (1) is a sufficient condition for the tasks which observe this relationship to be able to be scheduled according to a scheduling policy consisting in assigning an execution priority to each task according to its deadline (EDF scheduling policy).

Similarly, the feasibility test defined by the relationship (1) can be extended to the execution of m software tasks on a number p, at least equal to 2, of identical processors operating in parallel within a multiprocessor device. In this case, the feasibility test guaranteeing the real-time scheduling of m multiframe tasks on p processors operating in parallel is determined by satisfying the following relationship:

$$\sum_{i=0}^{m-1} \max_{0 \leq j \leq N-1} \left( \frac{C_i^j}{D_i^j} \right) \leq p \quad (9)$$

The relationship (9) is a generalization of the relationship (1) for a number p greater than 1 of processors.

The relationship (9) is demonstrated in a way similar to the relationship (1). A sufficient condition for all the tasks to be able to be scheduled on the p available processors is obtained by satisfying the following relationship for any $i<m$:

$$\frac{\sum_{k=0}^{i} C_k^{x_k}}{p} \leq D_i^{x_i} \quad (10)$$

In practise, on each deadline $D_i^{x_i}$, all the preceding tasks have to have been executed by distributing their execution load over the p available processors for the real-time constraint to be correctly observed.

It is then demonstrated, in a manner similar to the case of a single processor, that the relationship (9) implies the relationship (10) and that therefore the observation of the relationship (9) is sufficient to validate that all the tasks will indeed be executed by observing the real-time constraint.

The method according to the invention can be implemented by a scheduling device or scheduler incorporated in an operating system. The scheduler implements an EDF-type scheduling method and, when a dynamic task is added, the creation of this task is rejected if it does not satisfy the feasibility test of the relationship (1) for the case of a single processor or of the relationship (9) for the case of a plurality of processors.

Thus, a lock is added to the scheduler that makes it possible to guarantee that the real-time constraint is observed and that the application which is executed operates correctly.

Figure 5:
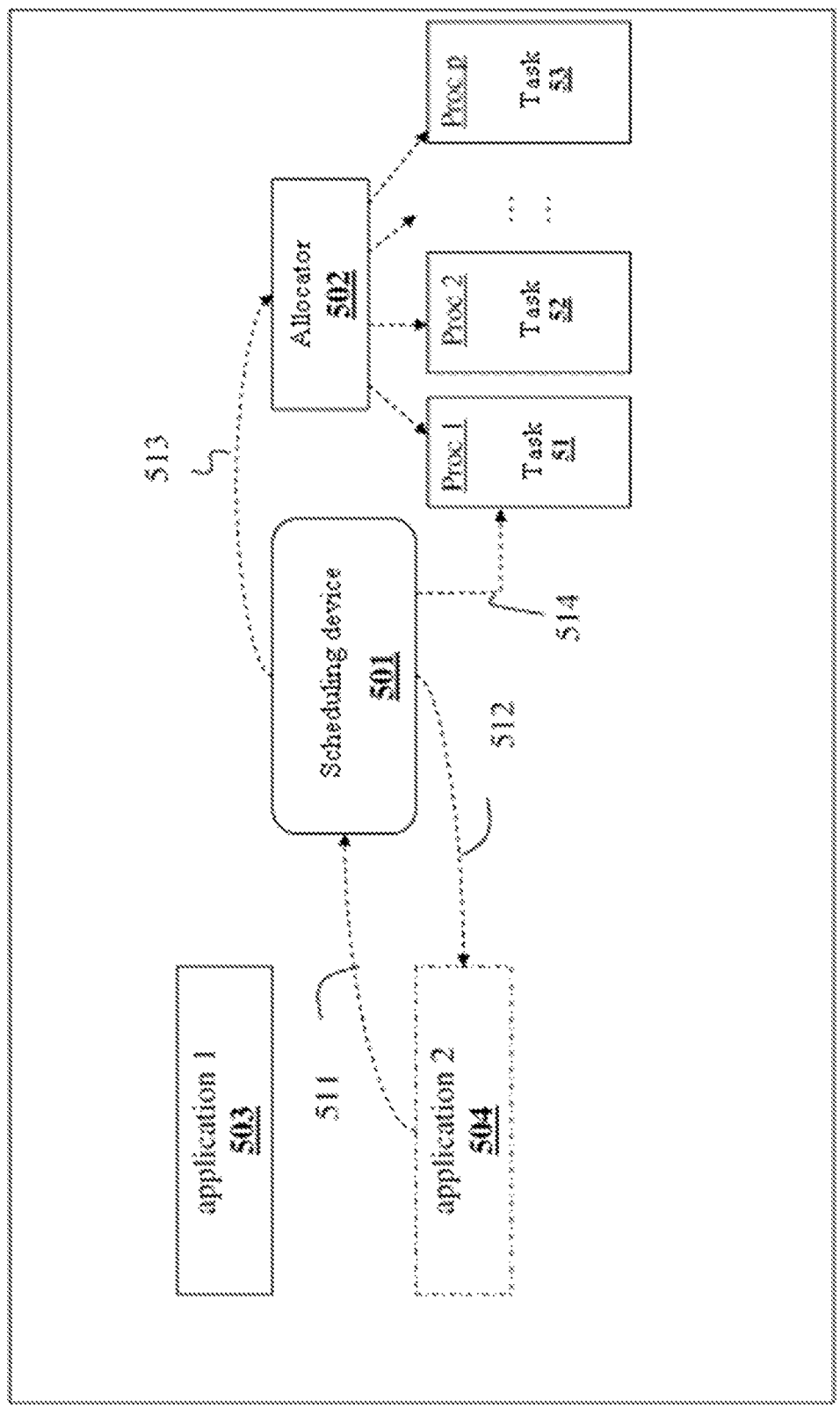

FIG. 5 illustrates an example of a scheduling device according to the invention used to guarantee the real-time dependability of an application that is executed on a platform comprising a number of identical processors.

The function of a scheduling device 501 is to guarantee the real-time execution of one or more software applications 503, 504. At a given instant, an application 504 creates 511 a software task whose execution time, execution deadline and guard time characteristics are transmitted to the scheduling device 501. The latter executes the method according to the invention as described previously by taking into account the creation 511 of this new task as well as the set of the tasks 51, 52, 53 already executed on a set of available processors Proc1, Proc2, ProcP. If the scheduling device 501 concludes on the non-feasibility of a real-time execution of the new created task 511, it rejects 512 this task in order to guarantee the dependability of the application 504 and returns a message to said application 504 in order to enable it to redefine the characteristics of said task 511.

If, on the other hand, the scheduling device 501 concludes on the feasibility of the real-time execution of the task 511, it authorizes 513 the addition of this new task and communicates this information to an allocation device 502 which positions the task 511 for an execution on one of the available processors according to an EDF-type scheduling policy (in other words, at a given instant, a processor whose resources are available selects from all the tasks to be executed the one whose execution deadline is the closest.

In a variant embodiment of the invention for which a single processor is used and this processor has the capacity to have a variable frequency enabling this frequency to change during the execution of the tasks, the method according to the invention also contains the following steps.

If the relationship (1) is not observed, it is noted that $$\delta = \sum_{i=0}^{m-1} \max_{0 \leq j \leq N-1} \left( \frac{C_i^j}{D_i^j} \right),$$

δ is therefore greater than one. In order to guarantee that the real-time constraint is observed, the scheduling device 501 triggers 514 the multiplication by a factor δ of the current operating frequency of the processor. If the new frequency obtained does not exceed the maximum operating frequency of the processor, it authorizes 513 the addition of the new task.

In practise, the multiplication by a factor δ of the execution frequency of the processor is equivalent to the division of all the execution times $C_i^j$ by this same quantity δ. Because of this, the sum $$\sum_{i=0}^{m-1} \max_{0 \leq j \leq N-1} \left( \frac{C_i^j}{D_i^j} \right)$$

then becomes equal to 1 and therefore observes the inequality (1). More generally, it can be seen that, to observe the inequality (1), it is sufficient to increase the frequency of the processor by a factor at least equal to δ.

Figure 4:
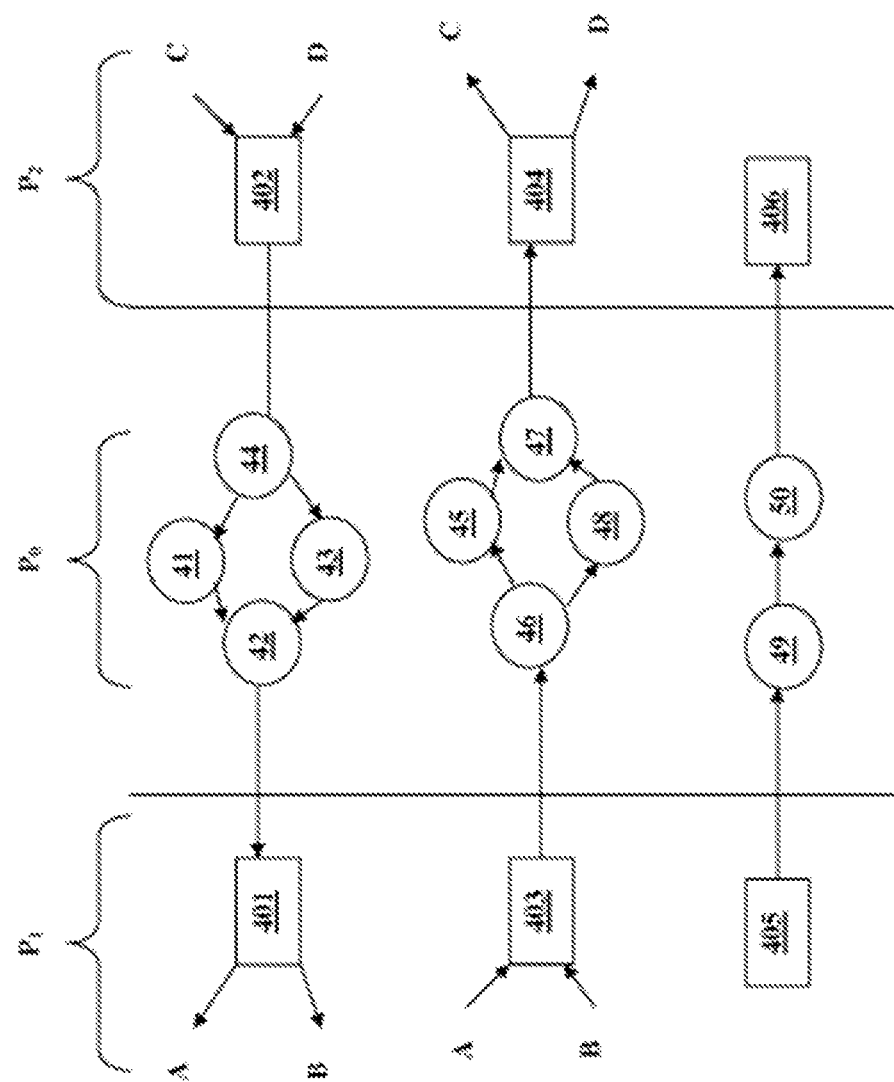

The method according to the invention applies notably to the design of multi-user communication systems. A transmission system is, more often than not, used by a number of users and makes it possible to also convey a plurality of different services having characteristics whose impact notably on the data frames and the execution times of the tasks is different. A video content transmission application may, for example, use data frames of a greater length than a text messaging application. The size of the frames impact on the execution time of the associated task. Furthermore, the instant of arrival, and therefore of processing, of the data frames in a bidirectional communication system is more often than not random because it is determined by events triggered by the users. This diversity of characteristics of the data frames makes it possible to apply, for the design of an architecture of a communication system, a model of multi-frame tasks as well as the scheduling method according to the invention using this model. An example of a real-time system architecture for which the invention applies is illustrated in FIG. 4. A real-time communication system between a number of users A, B, C, D is represented, comprising three processors $P_0$, $P_1$, $P_2$. The interest is focused on the scheduling of the tasks executed on the processor $P_0$. The latter executes a set of tasks 41, 42, 43, 44 associated with individual functions of a subsystem for receiving data sent by the users C and D via an application 402 to the users A and B. The reception subsystem made up of the tasks 41, 42, 43, 44 receives data packets in a random order, the reception of these packets triggers successive calls to the reception tasks 41, 42, 43, 44 which execute, for example, demodulation and/or channel decoding processing operations on the data before transmitting said data to the receiving application 401.

In parallel with this first transmission subsystem, a sending subsystem is also implemented on the processor $P_0$ to enable the users A and B to communicate in turn with the users C and D. A set of tasks 45, 46, 47, 48 execute processing operations that make it possible to format the data to be sent, for example a data modulation or channel coding function. The tasks 45, 46, 47, 48 making up the sending subsystem are executed independently and asynchronously with the tasks 41, 42, 43, 44 of the reception subsystem. Similarly, a signaling link makes it possible to transmit the information relating to the control and implementation of the sending/receiving means. This link is implemented between two applications 405, 406 and involves the execution of two tasks 49, 50 on the processor $P_0$.

The method according to the invention applies to this type of real-time system since each task is multi-frame and is executed in a non-predictable order from the point of view of the processor $P_0$ on which they are executed.

Another case of application for which the invention applies is the case where a task executes a processing operation on a single type of data frame, but the processor on which this task is executed has the capacity to modulate its consumption, for example by varying its execution frequency. In this case, if a number of consumption modes are available, the execution time of a same data frame will be different for each of these modes. The transition from one consumption mode to another may be performed over time in a non-predictable manner, notably according to constraints linked to the system. The method according to the invention described previously applies well in this case since there are one or more software tasks which execute a processing operation on a data frame whose execution time, notably, will vary over time according to the consumption mode of the processor. The design of such a system can be validated and its real-time execution guaranteed using the invention.

Generally, the invention applies to any set of concurrent software tasks originating from different sources and executing, in a non-predictable order, a processing operation on a set of data frames for which the execution and deadline times and the guard times are variable.

The invention notably has the advantage of making it possible to validate the design choices of an application or of a real-time system and to guarantee the feasibility of the execution of this system within the delay constraints to which it is subject. In particular, the invention makes it possible to guarantee the correct operation of a scheduler with dynamic priority such as a scheduler executing the EDF method and in particular to guarantee that the system will never be overloaded, in other words that its usage rate will never be greater than 100%.

REFERENCES

[1] A. K. Mok et D. Chen. A multiframe model for real time tasks. Proceedings of IEEE International Realtime System Symposium, pages 22-29, December 1996.
[2] S. Baruah, D. Chen, S. Gorinsky, A. Mok. Generalized multiframe tasks. 1996.

The invention claimed is:

1. A method for the real-time dynamic priority scheduling of an application executed on at least one processor, said application consisting of a plurality m of software tasks executing at least one processing operation on a plurality of N successive data frames, each of said tasks i being defined at least, for each of said frames j, by an execution time $C_i^j$, an execution deadline $D_i^j$ and a guard time $P_i^j$ with respect to the next frame j+1, said guard time $P_i^j$ being greater than or equal to said deadline $D_i^j$, said method comprising:
for each task i, calculating the ratios $$\frac{C_i^j}{D_i^j}$$

between the execution time $C_i^j$ of each frame j and the corresponding deadline $D_i^j$,
for each task i, searching for the maximum of said ratios over all of said frames j $$\max\left(\frac{C_i^j}{D_i^j}\right),$$

comparing the sum $$\sum_{i=0}^{m-1} \max_{0 \leq j \leq N-1}\left(\frac{C_i^j}{D_i^j}\right)$$

over all of said tasks i of said maxima with the number p of processors operating in parallel over which the total computation load of said real-time application is distributed,
if said sum $$\sum_{i=0}^{m-1} \max_{0 \leq j \leq N-1}\left(\frac{C_i^j}{D_i^j}\right)$$

is less than or equal to the number p of processors, then concluding on the feasibility of the real-time execution of all of said software tasks distributed over said processors and associating a dynamic execution priority with the task i according to its execution deadline $D_i^j$ so that, at a given instant, the task which has the highest priority is the one whose deadline is the closest in time $D_i^j$,
if said sum $$\sum_{i=0}^{m-1} \max_{0 \leq j \leq N-1}\left(\frac{C_i^j}{D_i^j}\right)$$

is strictly greater than the number p of processors, rejecting the task i and/or redefining its execution time $C_i^j$ and execution deadline $D_i^j$ parameters so as to satisfy the inequality $$\sum_{i=0}^{m-1} \max_{0 \leq j \leq N-1}\left(\frac{C_i^j}{D_i^j}\right) \leq p.$$

2. The scheduling method as claimed in claim 1, wherein said data frames are sequenced in a random order and do not observe a cyclic pattern in time.

3. The scheduling method as claimed in claim 1 wherein said tasks execute, on said data frames, signal processing functions and that said processors are digital signal processors.

4. The scheduling method as claimed in claim 1 wherein a single processor with a variable frequency is used and that said method also comprises the following steps:
if the following inequality $$\sum_{i=0}^{m-1} \max_{0 \leq j \leq N-1}\left(\frac{C_i^j}{D_i^j}\right) \leq 1$$

is not satisfied, then multiplying, by a factor δ at least equal to $$\sum_{i=0}^{m-1} \max_{0 \leq j \leq N-1}\left(\frac{C_i^j}{D_i^j}\right),$$

the frequency of said processor,
if said frequency multiplied by said factor δ is less than or equal to the maximum operating frequency of said processor, then associating a dynamic execution priority with the task i according to its execution deadline $D_i^j$ so that, at a given instant, the task which has the highest priority is the one whose deadline $D_i^j$ is the closest in time,
if said frequency multiplied by said factor δ is greater than the maximum operating frequency of said processor, then rejecting the task i and/or redefining its execution time $C_i^j$ and execution deadline $D_i^j$ parameters so as to satisfy the inequality $$\sum_{i=0}^{m-1} \max_{0 \le j \le N-1} \left( \frac{C_i^j}{D_i^j} \right) \le 1.$$

5. A scheduling device for a real-time application executed on at least one processor with a fixed or variable operating frequency, said application consisting of a plurality m of software tasks executing at least one function on a plurality N of successive data frames, said device further comprising means for implementing the scheduling method as claimed in claim 1.

6. A scheduling device for a real-time application executed on at least one processor with a fixed or variable operating frequency, said application consisting of a plurality m of software tasks executing at least one function on a plurality N of successive data frames, said device further comprising means for implementing the scheduling method as claimed in claim 2.

7. A scheduling device for a real-time application executed on at least one processor with a fixed or variable operating frequency, said application consisting of a plurality m of software tasks executing at least one function on a plurality N of successive data frames, said device further comprising means for implementing the scheduling method as claimed in claim 3.

8. A scheduling device for a real-time application executed on at least one processor with a fixed or variable operating frequency, said application consisting of a plurality m of software tasks executing at least one function on a plurality N of successive data frames, said device further comprising means for implementing the scheduling method as claimed in claim 4.

* * * * *